F. TURNER.
SHAWL-STRAP.

No. 172,526. Patented Jan. 18, 1876.

WITNESSES:
C. Neveux
A. F. Ferry

INVENTOR:
F. Turner
BY
Munn & Co.
ATTORNEYS.

UNITED STATES PATENT OFFICE.

FREDERICK TURNER, OF FRANKFORD, PHILADELPHIA, PENNSYLVANIA.

IMPROVEMENT IN SHAWL-STRAPS.

Specification forming part of Letters Patent No. 172,526, dated January 18, 1876; application filed September 11, 1875.

*To all whom it may concern:*

Be it known that I, FREDERICK TURNER, of Frankford, in the city and county of Philadelphia, and State of Pennsylvania, have invented a new and Improved Shawl-Strap; and I do hereby declare that the following is a full, clear, and exact description of the same, reference being had to the accompanying drawing forming a part of this specification.

My improvements in shawl-straps consist in the combination of the straps with a handle, which terminates at each end in a spring hook or loop for connecting the straps, so that they can be connected and disconnected readily. It also consists in the combination of cross-bar, having a hook or loop, with the handle and strap, all as will be hereinafter explained.

Figure 1:
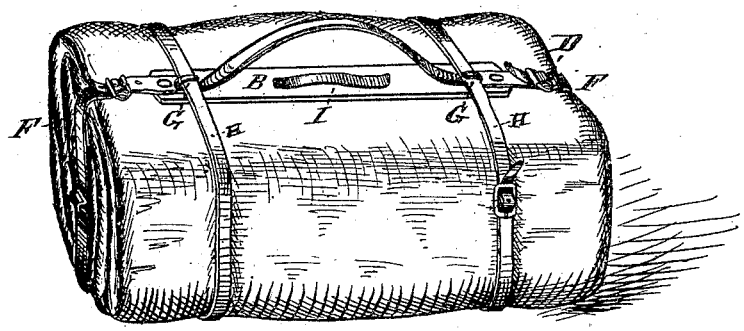
Figure 2:
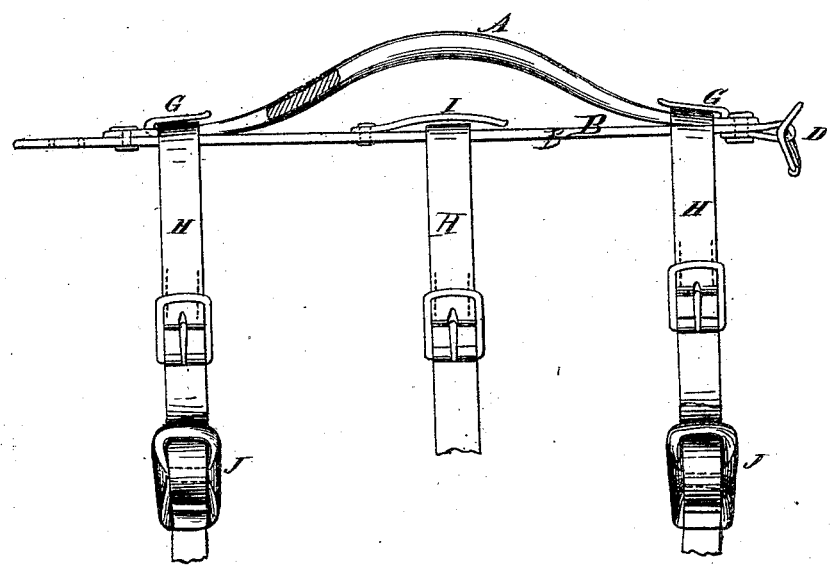

Figure 1 is a perspective view of a bundle secured by a handle shawl-strap with my improvements applied to it; Fig. 2, a side elevation of my improved strap.

A is the handle, and B a rigid bar, to which it is fastened by rivets. Attached to the end of the bar B is a buckle, D, for connecting a strap, F, which is used to bind the bundle lengthwise. G are spring hooks or loops attached to or formed upon the handle A, for readily connecting the straps H and keeping them in place on the handle.

For shortening and lengthening the straps I propose to use tongueless buckles or slides J, instead of the common tongue-buckles, as they can be worked quicker and easier. The bar B is provided at the center with a spring clasp or loop, I, to hold the middle strap in place thereon.

Having thus described my invention, what I claim as new is—

1. In combination with the straps H H, the handle A, terminating at each end in a spring hook or loop, as and for the purpose specified.

2. The cross-bar C, provided with a spring hook or loop, in combination with handle A and straps H H, as and for the purpose specified.

FREDERICK TURNER.

Witnesses:
H. C. STOUT,
C. F. JONES.